United States Patent [19]

Pinson

[11] 4,171,732

[45] Oct. 23, 1979

[54] DEVICE FOR FIXING AND DRIVING A DISPLACEMENT MEMBER OF A VEHICLE

[75] Inventor: Claude M. Pinson, Senlis, France

[73] Assignee: Poclain Hydraulics, Verberie, France

[21] Appl. No.: 871,184

[22] Filed: Jan. 21, 1978

[30] Foreign Application Priority Data

Feb. 4, 1977 [FR] France ............................. 77 03247

[51] Int. Cl.² .................................................. B60K 3/00
[52] U.S. Cl. ................................ 180/308; 91/491; 92/59; 60/458
[58] Field of Search .............. 180/66 F, 44 F; 91/491, 91/495, 54; 92/59; 60/458

[56] References Cited

U.S. PATENT DOCUMENTS

| 3,762,488 | 10/1973 | Dammon | 180/66 F |
| 3,932,076 | 1/1976 | Thibault | 418/177 |
| 3,960,061 | 6/1976 | Campbell | 91/506 |

FOREIGN PATENT DOCUMENTS

| 2160121 | 6/1973 | France | 180/66 F |
| 2270771 | 12/1975 | France | 180/44 F |

Primary Examiner—Edgar W. Geoghegan
Attorney, Agent, or Firm—Poms, Smith, Lande & Rose

[57] ABSTRACT

Apparatus for fixing and driving a displacement member (such as a wheel) of a vehicle is disclosed. In particular, an axle journal is coupled to the vehicle chassis. At least one rotating bearing surface is disposed between the displacement member and the axle journal for the rotatable assembly of the displacement member. A drive motor is provided having a stator which is removably attached to the axle journal and a rotor which is removably mounted to rotate with respect to the stator by means of rotating bearings in contact with the bearing surface. Since the rotating bearings of the motor only contact the removable bearing surface, the motor can be dismantled while maintaining the displacement member in place on the axle journal.

3 Claims, 3 Drawing Figures

DEVICE FOR FIXING AND DRIVING A DISPLACEMENT MEMBER OF A VEHICLE

BACKGROUND OF THE INVENTION

The present invention relates to a device for fixing and driving a displacement member of a vehicle.

The particular problem leading to the present invention is that of driving large haulage machines for which the load is distributed variably over a large number of wheels.

Such machines, which are advantageous as regards the size of the load transported, have, up to the present time, not been able to be used on ground where the conditions of adherence and rolling are poor. In fact, the non-driving wheels provoke a drag and no drive effort.

To enable these machines to move in the conditions which have just been evoked, the axle or the wheels which heretofore have not been driving, must be driven. To this end, the invention proposes the installation of motors, which are in principle auxiliary motors, but which may be principal, for the direct drive of each group of wheels, whatever the application of the mobile machine in question.

The motors used are preferably of the hydraulic type, but may be pneumatic, electric or the like.

OBJECT AND SUMMARY

The invention therefore has for its object a device for fixing and driving a displacement member of a vehicle, such as a wheel, on the chassis of this vehicle, constituted by an axle journal coupled to said chassis, by at least one rotating bearing surface diposed between said displacement member and said axle journal for the rotatable assembly of said displacement member, and by a drive motor comprising a stator which is fixed on the axle journal by removable fixing means and a rotor which is mounted to rotate with respect to the stator by means of rotating bearings and is fixed on the displacement member, likewise by removable fixing means.

In this fixing and drive device, the stator and the rotor are rigidly fixed on the axle journal and on the displacement member respectively, the rotating bearings of the motor being solely constituted by said rotating bearing surface, so that the motor may be dismantled by maintaining the displacement member in place on the axle journal.

The following arrangements are preferably adopted:

the stator and rotor are fixed on extreme transverse faces of the axle journal and of the displacement member, respectively, which transverse faces are both orientated in the same direction;

the motor is hydraulic and comprises a cylinder block constituting the stator and a housing constituting the rotor, whilst conduits arranged in the axle journal constitute the supply and delivery pipes of said motor.

DESCRIPTION OF THE DRAWINGS

The invention will be more readily understood on reading the following description with reference to the accompanying drawings, in which.

DESCRIPTION OF THE PREFERRED EMBODIMENTS

Figure 1:
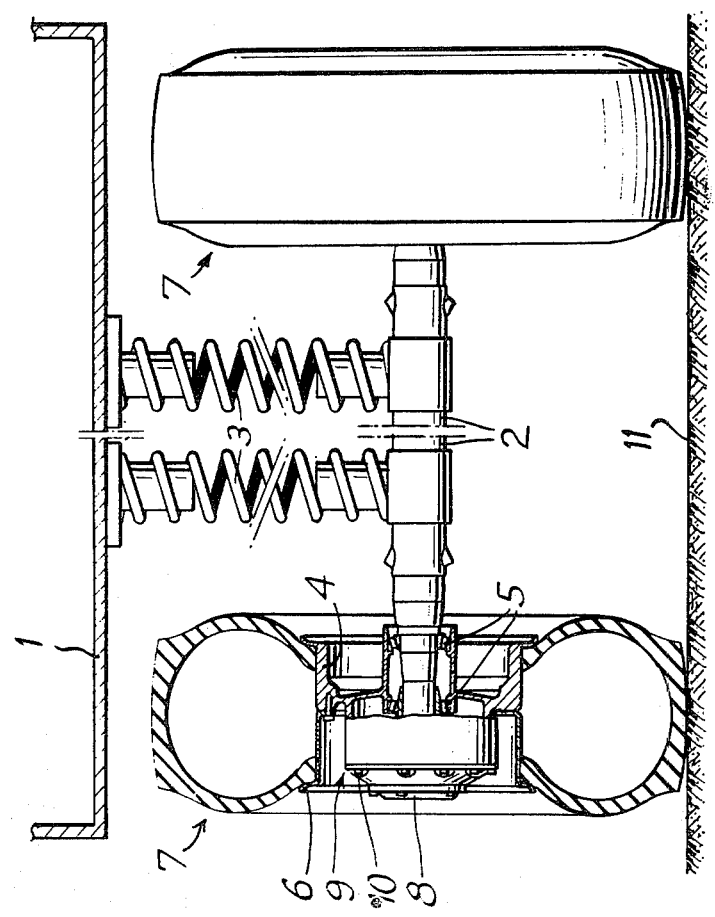
FIG. 1 is a simplified view of a trailer axle according to the invention.

Referring now to the drawings, FIG. 1 shows the chassis 1 of a vehicle which is coupled to an axle 2 by means of suspension springs 3. A hub 4 is mounted to rotate on each end of the axle 2, constituting the "journal", by means of roller bearings 5. On this hub is fixed the rim 6 of a wheel 7. The housing 8 of a hydraulic motor 9 is furthermore fixed on the hub 4 by screws 10. The wheels 7 rest on the ground 11.

Figure 2:
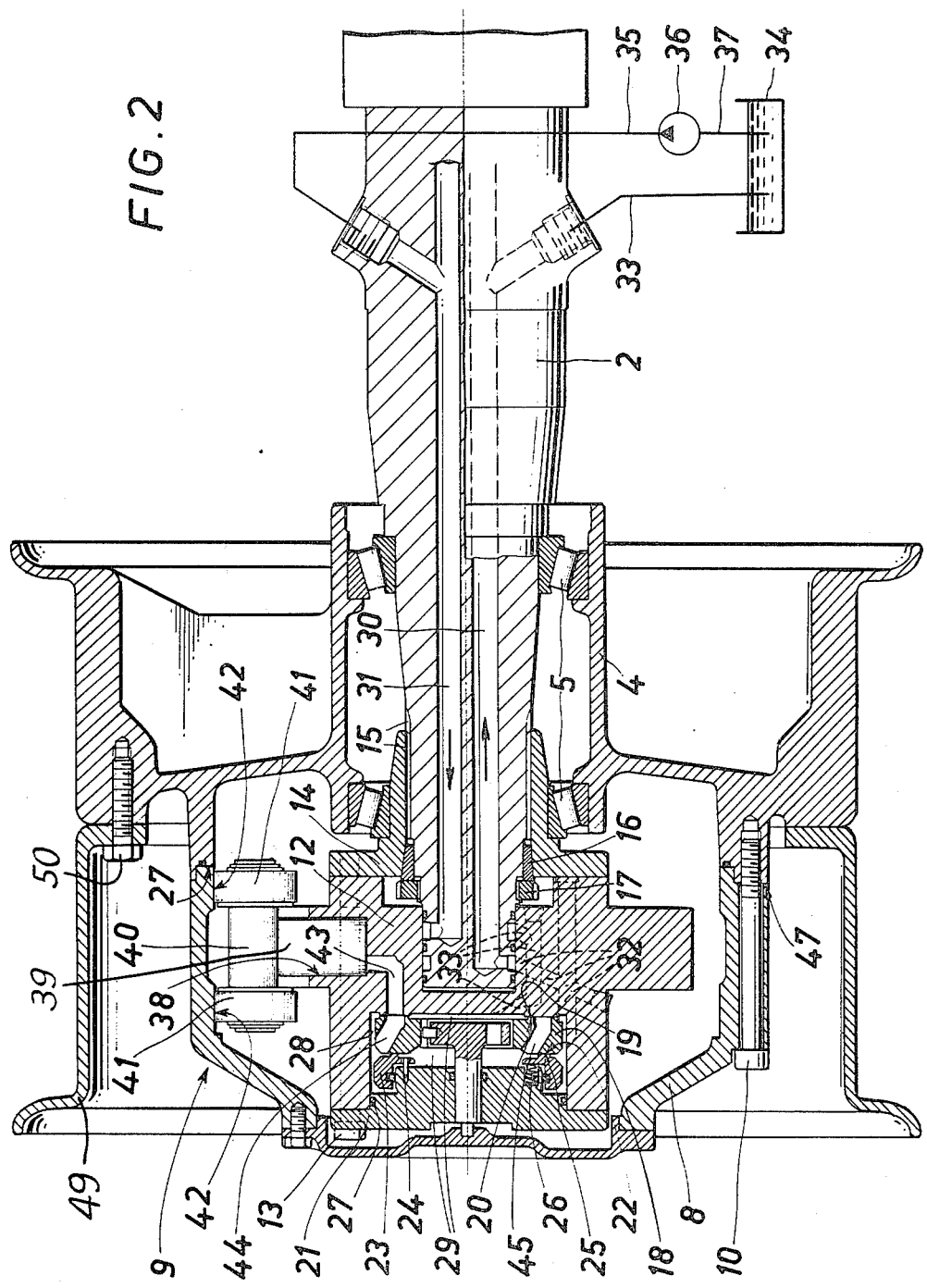
FIG. 2 is a detailed section of the drive motor of one of the wheels of the axle of FIG. 1.

FIG. 2 shows that the motor 9 is constituted by its housing 8, inside which is disposed the cylinder block 12, which is rigidly fixed by screws 13 on a fixing flange 14, itself fixed on the end of axle 2 by mating splines 15 which these two elements 14, 2 each include and by a conical ring 16 and a nut 17. This motor includes a plate 18 which is immobilized in rotation with respect to the housing 8 and of which the flat face 19 is in abutment on a corresponding flat face 20 of the cylinder block 12. A cylinder block cover 21 is fixed on said cylinder block by means of the same screws 13 which have already been mentioned and enables a reaction ring 23, maintained fast in rotation with the cylinder block 12 by a catch 24, but axially displaceable and pushed towards the rear face 25 of the plate 18 by springs 26, to effect the abutment of the face 19 of plate 18 on the face 20 of the cylinder block.

It should be noted that the cover 21 is assembled tightly (27) on the cylinder block 12 and defines a chamber 28. Furthermore, inside this chamber 28, another chamber 29 is defined by the space inside the support ring 22 of the ring 23 and by the abutment face 19 of the plate 18 on the cylinder block 12.

Conduits 30 and 31, made in the axle 2, open, on the radial periphery of the end of the axle, into conduits 32 and 33 made in the cylinder block 12 and which open out into chambers 28 and 29 respectively. Conduits 30, 31 are conventionally connected to conduit 33 returning to a fluid reservoir 34 and delivery conduit 35 of a pump 36, itself connected to reservoir 34 by its suction conduit 37.

It must be indicated that the cylinder block 12 comprises radial cylinders 38 containing pistons 39 which abut on beams 40 provided with rollers 41 allowing the displacement on cams 42 fast with housing 8. The conduits 43 connect each cylinder 38 to the face 20 of the cylinder block which is in abutment on the face 19 of the plate 18. This plate 18 has therein two groups of conduits 44, 45 which communicate with the chambers 28, 29 respectively and which, alternatively, communicate with the cnduits 43.

Figure 3:
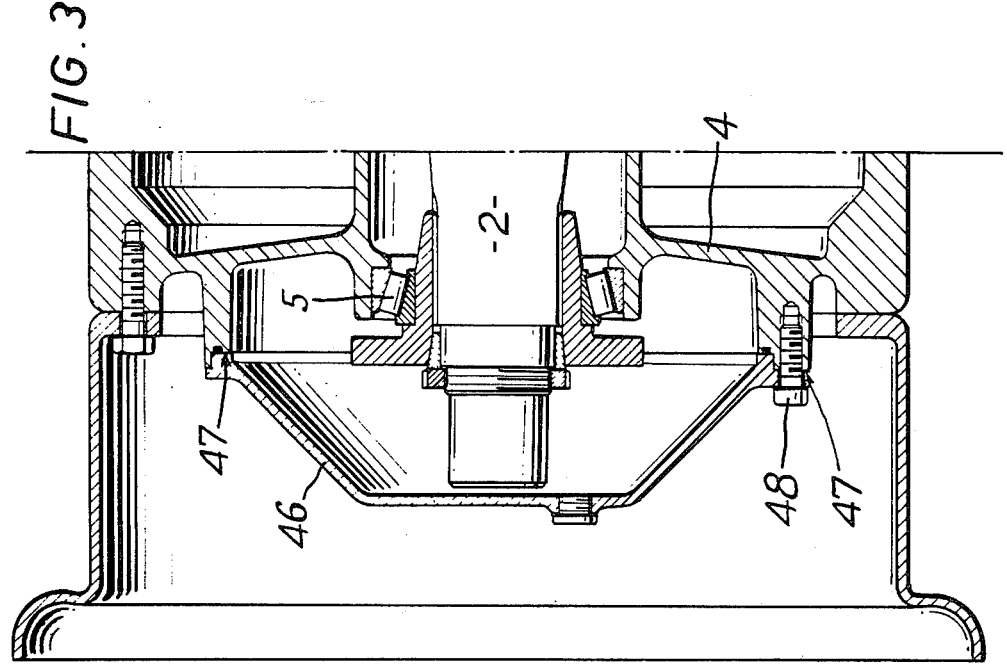
FIG. 3 shows an arrangement similar to that of FIG. 2, but without drive motor.

FIG. 3 shows a similar arrangement to that of FIG. 2, but in which the hydraulic motor 9 is absent. The hub 4 possesses in this case an end cover 46 which is fixed by screws 48 at the very spot 47 where the housing 8 was fixed.

Thus, the mode of fixation proposed for the motor 9 enables the cover 46 of an axle not provided with a drive motor, to be replaced by the hydraulic motor 9, simply and without modification to important elements.

The coupling of the motor 9 is very simple since it is effected rigidly by screws: screws 10 for fixing the housing 8 and screws 13 for fixing the cylinder block 12.

It must be noted that the fixing by means of screws 10 and 13 is effected, in the same way as the dismantling of the motor 9, so as not to change anything in the fixing of the wheel flange 49 on the hub 4 by means of the screws 50, this being very important as far as the possible maintenance and repair operations of the motor 9 are concerned.

It should also be noted that the bearings normally interposed between the cylinder-block and the housing of a motor have been eliminated, the rotating assembly of these elements being ensured by the main roller bearings 5 interposed between the hub and the axle 2.

Thus, from this point of view too, the transformation of a non-driven axle into an axle provided with motors driving the wheels is effected whilst conserving the assembly of the hub without change.

It may further be indicated that the wheels 7 may also conventionally be driven by half-shafts connected by a driving live axle to a diesel or petrol engine, the motors 9 then constituting auxiliary motors for displacement on difficult ground. The housing 8 would be fixed to the rotary hub, whilst the cylinder block would be fixed to the end of the live axle flared tube.

What is claimed is:

1. In a device for fixing and driving a displacement member of a vehicle, such as a wheel, on the chassis of said vehicle, constituted by an axle journal coupled to said chassis, at least one rotating bearing surface disposed between said displacement member and said axle journal for the rotatable assembly of said displacement member, and by a drive motor comprising a stator which is fixed on the axle journal by removable fixing means and a rotor which is mounted to rotate with respect to the stator by means of rotating bearings and is fixed on the displacement member, likewise by removable fixing means, the stator and the rotor are rigidly fixed on the axle journal and on the displacement member respectively, the rotating bearings of the motor being solely constituted by said rotating bearing surface, so that the motor may be dismantled by maintaining the displacement member in place on the axle journal.

2. The device of claim 1, wherein the stator and rotor are fixed on extreme transverse faces of the axle journal and of the displacement member, respectively, which transverse faces are both orientated in the same direction.

3. The device of claim 1, wherein in manner known per se, the motor is hydraulic and comprises a cylinder block constituting the stator and a housing constituting the rotor, whilst conduits made in the axle journal constitute the supply and delivery pipes of said motor.

* * * * *